(12) United States Patent
Tibbitts et al.

(10) Patent No.: US 8,813,786 B2
(45) Date of Patent: Aug. 26, 2014

(54) HYDRAULIC VALVES WITH INTEGRAL SEALS

(75) Inventors: Matthew H Tibbitts, Windsor (GB); Andrew D Gledhill, Stonehaven (GB); David S Innes, Inverurie (GB)

(73) Assignee: Aker Subsea Limited, Maidenhead, Berkshire (GB)

( * ) Notice: Subject to any disclaimer, the term of this patent is extended or adjusted under 35 U.S.C. 154(b) by 602 days.

(21) Appl. No.: 12/374,120

(22) PCT Filed: Jul. 18, 2007

(86) PCT No.: PCT/GB2007/002724
§ 371 (c)(1),
(2), (4) Date: Jan. 16, 2009

(87) PCT Pub. No.: WO2008/012508
PCT Pub. Date: Jan. 31, 2008

(65) Prior Publication Data
US 2009/0229693 A1 Sep. 17, 2009

(30) Foreign Application Priority Data
Jul. 28, 2006 (GB) .................................. 0614989.2

(51) Int. Cl.
*F16K 11/07* (2006.01)
*F15B 13/04* (2006.01)
(52) U.S. Cl.
USPC ............ 137/625.69; 137/625.68; 137/596.12
(58) Field of Classification Search
USPC ............ 137/625.68, 625.69, 625.27, 625.67, 137/625.25, 596.12
See application file for complete search history.

(56) References Cited

U.S. PATENT DOCUMENTS 2,293,906 A * 8/1942 Kvavle et al. ............ 137/625.68
2,471,285 A * 5/1949 Rice .......................... 137/625.68
(Continued)

FOREIGN PATENT DOCUMENTS

DE 20 56 989 6/1972
DE 8508048 U1 7/1985
(Continued)

OTHER PUBLICATIONS

Office Action dated Dec. 30, 2011, in U.S. Appl. No. 12/304,821.
(Continued)

*Primary Examiner* — Len Tran
*Assistant Examiner* — Chee-Chong Lee
(74) *Attorney, Agent, or Firm* — Nixon & Vanderhye PC

(57) ABSTRACT

A hydraulic valve comprises a plurality of ports, which communicate with a passageway, and a valve member movable in the passageway to control the communication between the ports. The valve member carries a lateral shear seal which is integral with the valve member and engages the passageway. In one position, the valve member isolates a first port from a second port. In another position of the valve member, the shear seal communicates with the first port and provides communication between the first port and the second port by way of a passage within the valve member. The valve member has first and second portions of different effective cross-section areas and on each portion an integral sealing member makes a radial seal between the valve member and the passageway. A supply port supplies pressure to the outside of the valve member so as to produce by virtue of the different cross-sectional areas a force tending to move the valve member towards a closed position.

8 Claims, 2 Drawing Sheets

(56) References Cited

U.S. PATENT DOCUMENTS

| | | | |
|---|---|---|---|
| 2,910,050 A * | 10/1959 | Dotter et al. | 137/625.66 |
| 3,401,711 A | 9/1968 | Kubilos | |
| 3,527,253 A | 9/1970 | Harpman | |
| 3,807,441 A | 4/1974 | Grosseau | |
| 3,996,965 A | 12/1976 | Peters | |
| 4,193,421 A | 3/1980 | Sakakibara et al. | |
| 4,210,065 A * | 7/1980 | Switzer | 137/625.68 |
| 4,217,934 A | 8/1980 | Peters | |
| 4,641,693 A | 2/1987 | Rakucewicz | |
| 4,643,228 A * | 2/1987 | Spencer | 137/625.68 |
| 4,664,152 A * | 5/1987 | O'Mara | 137/625.68 |
| 4,711,269 A | 12/1987 | Sule | |
| 4,722,262 A | 2/1988 | Muschong et al. | |
| 5,325,891 A * | 7/1994 | Mateja | 137/625.68 |
| 5,496,101 A | 3/1996 | Kurokawa et al. | |
| 6,427,970 B1 | 8/2002 | Silva | |
| 6,871,668 B2 | 3/2005 | Moreno | |
| 2002/0029813 A1 | 3/2002 | Suto et al. | |

FOREIGN PATENT DOCUMENTS

| | | |
|---|---|---|
| DE | 38 33 079 | 4/1990 |
| DE | 4119402 A1 | 12/1992 |
| DE | 4443373 A1 | 6/1995 |
| DE | 203 18 992 | 4/2005 |
| EP | 0 349 723 | 1/1990 |
| GB | 2 039 150 | 7/1980 |
| GB | 2 186 349 | 8/1987 |
| GB | 2 240 158 | 7/1991 |
| GB | 0 785 558 | 7/1997 |
| GB | 2 344 405 | 6/2000 |
| GB | 2 369 874 | 6/2002 |
| JP | 59-80576 | 5/1984 |
| WO | WO 2006/006873 | 1/2006 |

OTHER PUBLICATIONS

International Search Report dated Oct. 26, 2006, re GB 0614989.2.
International Search Report dated Sep. 6, 2006, re GB 0610813.8.
International Search Report dated Sep. 11, 2007, re PCT/GB2007/001634.
International Search Report for PCT/GB2007/002724, mailed Oct. 17, 2007.
Written Opinion of the International Searching Authority for PCT/GB2007/002724, mailed Oct. 17, 2007.
UK Search Report for GB Application No. 0614989.2, dated Oct. 26, 2006.
Office Action Issued Apr. 30, 2014, in German Patent Application No. DE 11 2007 001 717.1 with English translation.

* cited by examiner

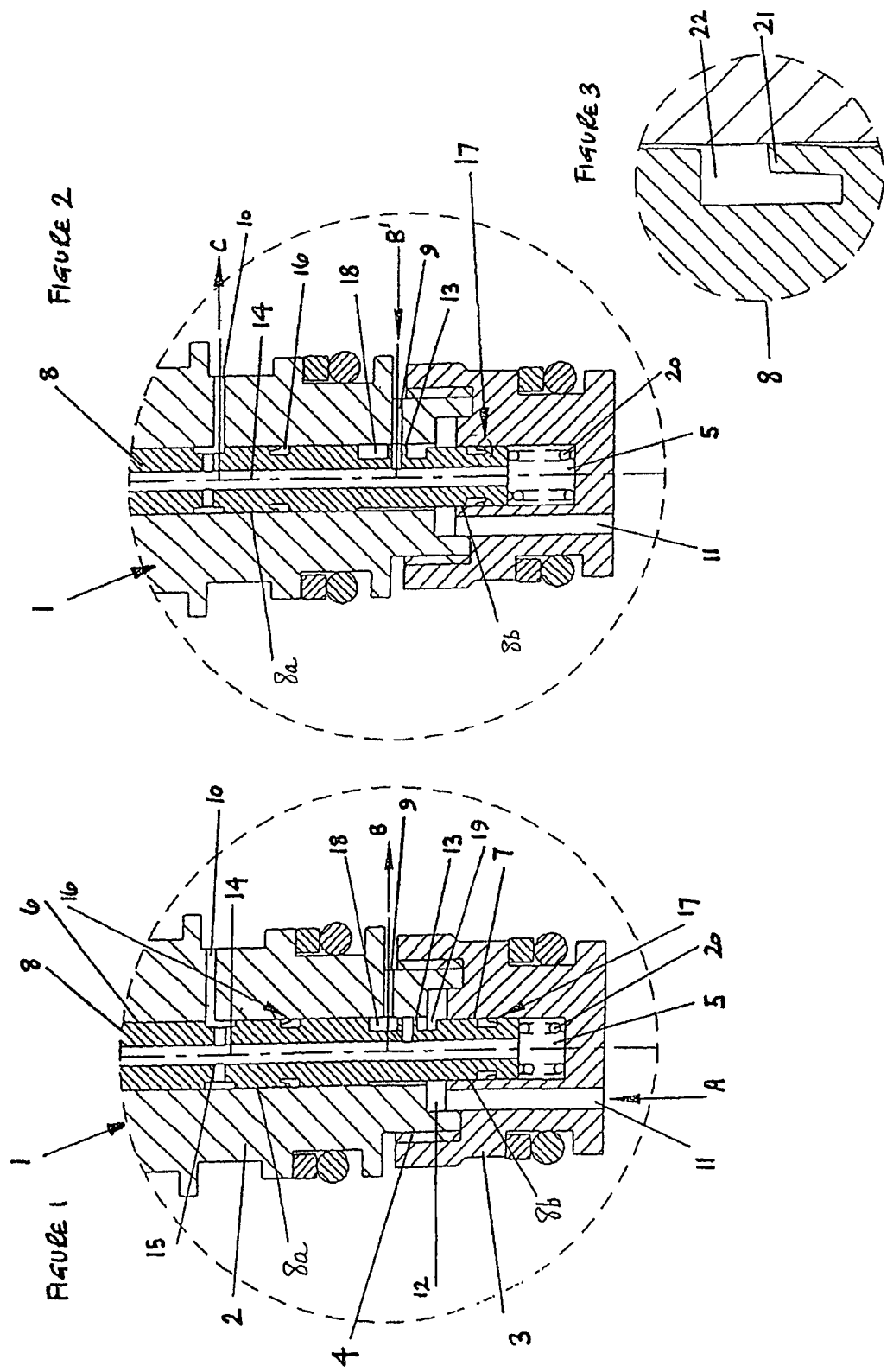

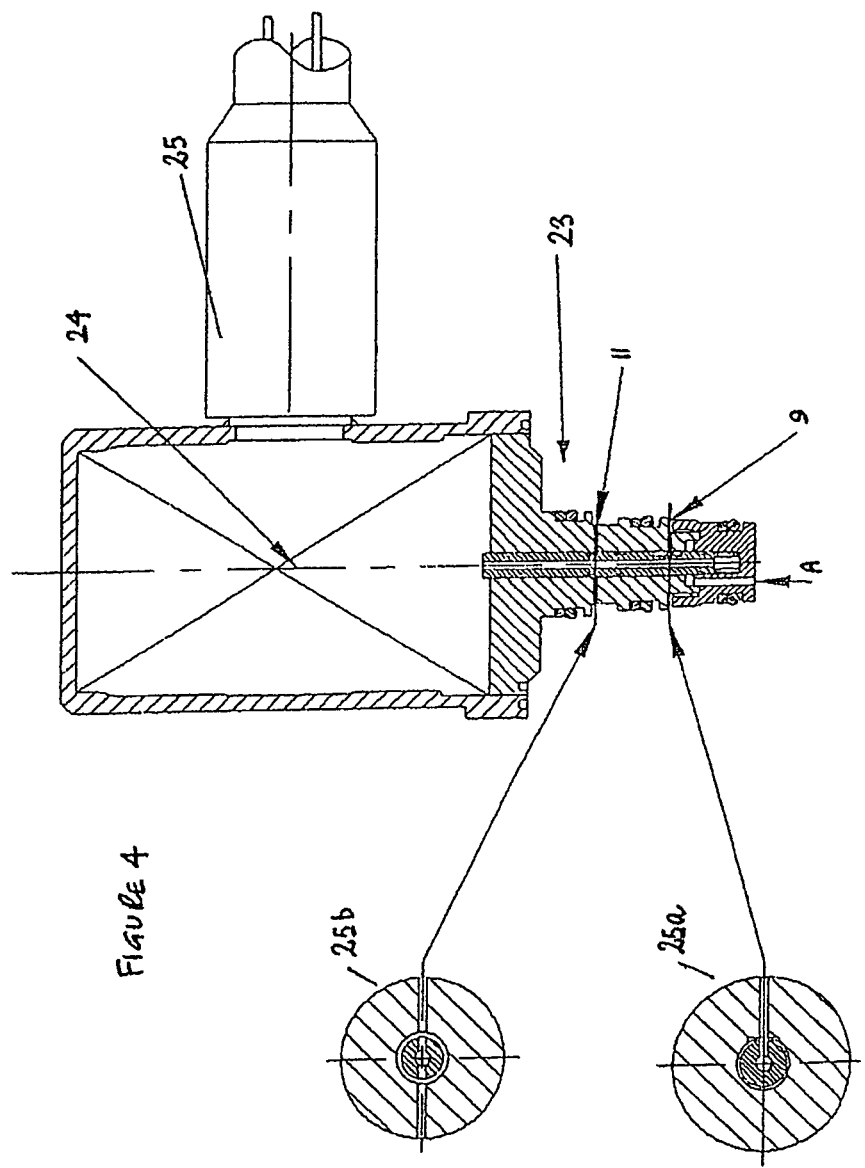

HYDRAULIC VALVES WITH INTEGRAL SEALS

This application is the U.S. national phase of International Application No. PCT/GB2007/002724, filed 18 Jul. 2007, which designated the U.S. and claims priority to GB Application No. 0614989.2, filed 28 Jul. 2006, the entire contents of each of which are hereby incorporated by reference.

FIELD OF THE INVENTION

This invention relates to hydraulic valves and particularly though not necessarily exclusively to hydraulic pilot valves such as may be used to control the supply of hydraulic fluid under pressure for the actuation of a larger valve such as a directional control valve or a choke control valve, typically for use in wellhead manifolds.

BACKGROUND TO THE INVENTION

It is known from, for example, the published patent applications GB-2344405-A and GB-2410043-A to provide in a directional control valve a shear seal which consists of two cylindrical seals of which the rims bear against valve flanges that accommodate ports, the seals being urged apart by an intermediate compression spring, the seals and the spring being disposed in a transverse bore in a piston movable in a valve body.

One object of the invention is to provide an improved valve that provides a shear seal, particularly between a supply port and a function port. Another object of the invention is to provide a valve with seals, and in particular a shear seal, integral with a movable valve member. A further object of the invention is to provide a valve in which system pressure and the configuration of various seals combine to provide a 'return' force in a desired direction on a valve member.

SUMMARY OF THE INVENTION

The invention provides in one aspect a hydraulic valve comprising a valve body including a passageway, a plurality of ports communicating with said passageway by respective openings spaced apart along the passageway and a valve member movable in and along the passageway to control the communication between the ports, the valve member carrying a lateral shear seal which is integral with the valve member and engages the passageway, wherein for one position of the valve member the valve member isolates a first port from a second port and in another position of the valve member the shear seal communicates with the first port and provides communication between the first port and a second port by way of a passage within the valve member.

Preferably the shear seal comprises a cylindrical part of which a rim engages the passageway and of which an interior is connected to the said passage within the valve member.

The movable valve member may comprise a rod which has portions of greater and lesser section to each side of the shear seal. Each of those portions may include a circumferential lip seal integral with the member and engaging the said passageway. For each lip seal, the valve member may include a circumferential external slot and the respective lip seal may be formed at one side of the slot. The lip seal, being preferably undercut, aids its sealing function by being flexible; when system pressure is applied, the seal is forced into contact with the adjacent wall. Such a lip seal is self-compensating for wear.

In a preferred form of the invention a third port can communicate, in dependence on the position of the valve member, with the first port externally of the valve member, and preferably by way of a space between the passageway and the portion of lesser section of the valve member.

The passage within the valve member may extend to allow equalisation of hydraulic pressure between the ends of the valve member, thereby preventing hydraulic lock of the valve member.

According to another aspect of the invention a hydraulic valve comprises a valve body including a passageway, supply, function and return ports communicating with said passageway by way of respective openings spaced apart along the passageway and a valve member movable in the passageway to control the communication between the ports, the valve member including a longitudinal internal passage, wherein, in dependence on the position of the valve member within the passageway, the function port is capable of communication with the return port by way of the internal passage in the member and the function port is otherwise capable of communication with the supply port externally of the valve member body, the valve member having integral sealing members such that for one position of the member fluid can flow from the supply port to the function port and the function port is isolated from the return port and for another position of the valve member the supply port is isolated from the function port and the function port can communicate with the return port by way of the said internal passage.

Preferably one integral sealing member comprises a cylindrical shear seal, which is positionable to surround an opening for the function port in the passageway and of which the interior is connected to the said internal passage in the valve member.

Another integral sealing member includes a circumferential lip seal providing a radial seal between the valve member and the valve passageway.

According to a further aspect the invention also provides a hydraulic valve comprising a valve body including a passageway, supply, function and return ports communicating with said passageway by way of respective openings spaced apart along the passageway and a valve member movable in the passageway to control the communication between the ports, and between an open position, wherein hydraulic fluid is supplied from a supply port to a function port, and a closed position, the valve member including first and second portions of different effective cross-sectional areas and on each portion a sealing member making a radial seal between the valve member and the passageway, and wherein the supply port is disposed to supply hydraulic pressure to the outside of the valve member so as to produce by virtue of the different effective cross-sectional areas a force tending to move the valve member towards the closed position.

The invention will now be described in greater detail with reference to a particular example and with reference to the accompanying drawings, in which:

FIG. 1 illustrates the main parts of a valve according to the invention.

FIG. 2 illustrates the main parts of a valve according to the invention, for a different position of a valve member.

FIG. 3 illustrates a lip seal

FIG. 4 illustrates in lesser detail a valve according to the invention with an associated actuator.

DETAILED DESCRIPTION

In the exemplary embodiment of the invention illustrated in FIGS. 1 and 2, a hydraulic pilot valve comprises a body 1 which in this embodiment includes a main part 2 and an end cap 3 which is secured to the main part 2 by a screw fitting 4.

The body of the valve defines a valve passageway 5 which is partly constituted by a bore 6 in the body part 2 and partly constituted by a bore 7 in the end cap 3. The bore 7 is axially aligned with the bore 6 but is of slightly lesser size (i.e. diameter) than the bore 6.

Movable in the passageway 5 is a valve member 8. The position of this valve member controls the fluid communication between various ports which in this example comprise a first (outlet) port 9, hereinafter called 'function port', a second port 10, hereinafter called 'return port', and a third port 11, hereinafter called 'supply port'. The three ports open to the passageway 5 by way of respective openings in the inside wall of the body. In particular the function port 9 has an opening near the lower end of the bore 6, the second port 10, which in this embodiment has two branches (as shown in FIG. 4) has two opposite openings near the upper end of the bore 6 and the third port 11 opens to the passageway 5 via a chamber 12 between the main part 2 and the end cap 3 of the body 1.

The valve member 8 (which is preferably of a suitable corrosion-resistant, elastic metallic material) is in this embodiment in the form of a stepped rod which at its upper end fits closely within the larger section bore 6 and at its lower end fits closely within the lesser section bore 7.

Extending laterally (i.e. radially) at a suitable position near the lower end of the valve member 8 is a shear seal 13 in the form of a short cylinder of which the rim engages the wall of the passageway 5, in particular the inside wall of the bore 6. The shear seal 13 is hollow, and the interior of it leads to a drilled internal passage 14 which extends along and within the valve member 8. Preferably this internal passage 14 extends to both ends of the valve member 8. It thereby serves to equalise pressure at each end of the valve member, preventing hydraulic lock of the valve member 8. The internal passage serves to connect the interior of the shear seal 13 with a lateral passage 15 which communicates with the second port, i.e. the return port 10, and thereby, depending on the position of the valve member 8, allows fluid communication between the function port 9 and the return port 10.

Disposed on the upper, larger section, portion 8a of the valve member 8 is a lip seal 16 which is integral with the valve member. Disposed on the lower, smaller section portion 8b of the valve member 8 and integral with the valve member is another lip seal 17. The lip seal 16 provides a radial (preferably metal-to-metal) seal between the valve member 8 and the valve body to prevent flow of fluid external of the valve member between the function port 9 and the return port 10. The seal 17 prevents fluid flow along and outside the valve member 8 to the lower end of the valve member. The supply port 11 communicates with the passageway at a position between the seals 16 and 17. owing to the different effective cross-sectional areas of the portions 8a and 8b the supply pressure produces on the valve member a net force tending to move the valve member 8 to the closed position shown in FIG. 2.

At each side of the shear seal (above and below it as shown in FIGS. 1 and 2) are recesses 18 and 19 of which recess 18 can be generally aligned with the port 9 and communicates with port 11 and with recess 19 by way of the space between the bore 6 and the outside of the portion of lesser section of the valve member 8.

The valve member 8 is urged from a first, open, position shown in FIG. 1 towards an second, closed position shown in FIG. 2 by a resilient bias provided by a compression spring 20 disposed between the lower end of the valve member 8 and the bottom of the bore 7 in the end cap. The valve member may be moved against the force of the spring to the open position by means of an actuator, not shown in FIGS. 1-3, of which the member may constitute an armature.

For the position of the valve member 8 shown in FIG. 1, hydraulic fluid under pressure from a suitable source (not shown) enters the port 11, as shown by arrow A, and is communicated to the function port 9 externally of the valve member, by way of chamber 12 and recess 18, which in this position is open to the port 9. The supply pressure urges the shear seal onto the sealing face (the wall of the passageway). The shear seal 13 is out of communication with the function port 9 and the valve member (including the upper lip seal 16) isolates the function port 9 from the return port 10.

In the 'closed' position of the valve member 8, as shown in FIG. 2, the recess 18 is out of communication with the function port 9 (being closed by the wall of the bore 6) but the shear seal 13 is in communication with the port 9. Preferably the shear seal is large enough to encircle the opening for the port 9 in the wall of the bore 6. The shear seal when in communication with the port 9 provides communication from the function port 9 by way of the internal passage 14 to the return port 10, to allow venting, as shown by arrows B' and C, of fluid from the function port to a return line coupled to the return port. The shear seal also prevents flow of supply fluid to the function port 9 when it is positioned over the port's opening as shown in FIG. 2.

FIG. 3 illustrates the lip seal 17. The two seals 16 and 17 are similar, although of slightly different diameters so that supply pressure can generate a return force assisting the force of the spring. The seal 17 is formed by a lip 21 at one side of an annular circumferential recess 22 in the outer surface of the member 8. The seal 17 is formed by appropriate machining of the valve member 8, to provide the lip 21 with a slight, elastic outward curl.

FIG. 4 illustrates the valve, denoted generally by the numeral 23, in combination with an actuator 24. The main valve body part 2 is constituted as an end cap for the actuator 24. The construction of the actuator is not directly relevant to the invention and so will not be described. It may have a controlling electronic circuit within a casing 25.

FIG. 4 illustrates at 25a and 25b the cross section through the valve body and the valve member at the locations of the function port 9 and the return port 10 respectively.

The invention claimed is:
1. A hydraulic valve comprising:
a valve body including:
 a passageway;
 supply, function and return ports communicating with said passageway by respective openings spaced apart along said passageway; and
 a valve member that is movable in and along said passageway to control fluid communication between said ports and includes a longitudinal internal passage extending within said valve member, said valve member carrying a lateral transverse shear seal in the form of a short cylinder which is integral with said valve member and engages said passageway;
wherein, for one position of said valve member, said valve member isolates said function port from said return port and in another position of said valve member said shear seal communicates with said function port and provides fluid communication between said function port and said return port by way of said longitudinal internal passage within said valve member;
wherein said valve member comprises a stepped rod which has portions of greater and lesser effective cross-sec- tional area section to each side of said shear seal and a recess between said portions; and wherein said supply port can communicate, in dependence on the position of said valve member, with said function port externally of said valve member, and said supply port supplies pressure to the outside of the valve member with said recess between said portions to produce a force tending to move said valve member towards said another position, said supply port being in communication with said function port for said one position of said valve member and out of communication with said function port for said another position of said valve member.

2. The hydraulic valve of claim 1 wherein said shear seal comprises a cylindrical part of which a rim engages said passageway and of which an interior is connected to said passage within said valve member.

3. The hydraulic valve of claim 1 wherein each of said portions includes a circumferential lip seal integral with said valve member and engaging said passageway.

4. The hydraulic valve of claim 3 wherein for each lip seal said valve member includes a circumferential external slot and the respective lip seal is formed at one side of the slot.

5. The hydraulic valve of claim 1 wherein said longitudinal passage within said valve member extends to both ends of said valve member to allow equalization of hydraulic pressure between said ends of said valve member.

6. A hydraulic valve comprising:
a valve body including:
a passageway;
supply, return and function ports communicating with said passageway by way of respective openings spaced apart along said passageway; and
a valve member which is movable in and along said passageway to control fluid communication between said ports and includes a longitudinal internal passage extending within said valve member, said valve member carrying a lateral transverse shear seal in the form of a short cylinder which is integral with said valve member and a rim of said shear seal engages said passageway, said valve member being movable between an open position wherein hydraulic fluid is supplied from said supply port to said function port, and a closed position, wherein said supply port is out of communication with said function port;

wherein said valve member comprises a stepped rod which includes first and second portions of different effective cross-sectional areas to each side of said shear seal and a recess between said portions; each of said first and second portions comprise a circumferential lip seal integral with the valve member, wherein said lip seal comprises a lip with an elastic outward curl which engages said passageway wherein said supply port is disposed to supply hydraulic pressure to the outside of said valve member so as to produce by virtue of the different effective cross-sectional areas a force tending to move said valve member towards said closed position; and said longitudinal internal passage providing hydraulic communication from said function port to said return port when said valve member is in said closed position.

7. The hydraulic valve of claim 6 and including a return spring acting on said valve member to tend to move said valve member towards said closed position.

8. The valve of claim 6 wherein said supply port communicates with a space between said passageway and said valve member and between said portions of greater and lesser effective cross-sectional area.

\* \* \* \* \*